United States Patent [19]

Block

[11] 4,274,435
[45] Jun. 23, 1981

[54] EXCESS PRESSURE VALVE PARTICULARLY FOR A FLUID PRESSURE OPERATED TELESCOPIC SUPPORTING ELEMENT EMPLOYED IN UNDERGROUND MINING

[75] Inventor: Siegmar Block, Essen, Fed. Rep. of Germany

[73] Assignee: Thyssen Industrie AG, Fed. Rep. of Germany

[21] Appl. No.: 50,104

[22] Filed: Jun. 19, 1979

[30] Foreign Application Priority Data

Jul. 27, 1978 [DE] Fed. Rep. of Germany ....... 2832964

[51] Int. Cl.³ .......................................... F16K 31/122
[52] U.S. Cl. .................. 137/508; 137/538; 137/540; 137/556
[58] Field of Search .......... 137/538, 540, 542, 543.13, 137/556, 474, 508

[56] References Cited

U.S. PATENT DOCUMENTS

| | | | |
|---|---|---|---|
| 1,356,130 | 10/1920 | Coxon | 137/556 |
| 2,906,289 | 9/1959 | Fox | 137/508 |
| 3,054,420 | 9/1962 | Williams | 137/508 |
| 3,189,040 | 6/1965 | Johnson | 137/542 |
| 3,211,175 | 10/1965 | Replogle | 137/508 |
| 3,366,138 | 1/1968 | Graham | 137/538 |
| 3,482,594 | 12/1969 | Simon | 137/538 |
| 3,548,867 | 12/1970 | Grisebach | 137/538 |
| 4,074,695 | 2/1978 | Weirich et al. | 137/508 |
| 4,099,894 | 7/1978 | Indra | 137/538 |

FOREIGN PATENT DOCUMENTS

| | | |
|---|---|---|
| 1303157 | 2/1973 | Fed. Rep. of Germany . |
| 2408106 | 8/1975 | Fed. Rep. of Germany . |
| 2130472 | 1/1978 | Fed. Rep. of Germany . |
| 7802256 | 1/1978 | Fed. Rep. of Germany . |

Primary Examiner—Martin P. Schwadron
Assistant Examiner—H. Jay Spiegel
Attorney, Agent, or Firm—McGlew and Tuttle

[57] ABSTRACT

An excess pressure valve particularly for props having telescopic parts which are extensible or retractable by fluid under pressure used in underground mining operations, comprises a valve housing having a bore therethrough with a connection end connectable to the fluid under pressure and an opposite opened end. A tubular sleeve is slidable in the bore and has a passage therethrough for the fluid under pressure and it has an annular inlet end face facing the connection end and an opposite annular pressure end face which opposes a piston which is also slidable in the bore between the sleeve and the opened end. The fluid under pressure maintains the sleeve and the piston in slightly spaced relationship so that there is a small space therebetween which is sealed by an annular pressure seal. When the fluid under pressure reaches a predetermined pressure the space moves beyond the seal and communicates with a discharge relieving bore and when it moves beyond this initial position it communicates with a larger bore permitting the discharge of the fluid under pressure from the valve. The construction advantageously includes a spring plate which is biased by a spring against the piston to urge it to the connection end. An additional spring is employed to bias the sleeve in a direction toward the piston. The spring plate is advantageously interposed between a coil spring and the piston and this spring plate carries a rod member which forms a load indicating device which projects out the open end when the pressure increases to indicate by indications on the rod the amount of pressure in the fluid pressure system.

5 Claims, 4 Drawing Figures

EXCESS PRESSURE VALVE PARTICULARLY FOR A FLUID PRESSURE OPERATED TELESCOPIC SUPPORTING ELEMENT EMPLOYED IN UNDERGROUND MINING

FIELD AND BACKGROUND OF THE INVENTION

The following German patents are important references in respect to the inventive subject matter of which the present invention is an improvement thereover:

REFERENCES

German DE-PS Pat. No. 13 03 157
German DE-AS Pat. No. 21 30 472
German DE-OS Pat. No. 24 08 106
German DE-GM U.M. No. 78 02 256

Hydraulic supporting elements in underground mining are exposed to various loads. For example, they must stand a relatively slowly increasing load due to the convergence of roof and floor, so that the used excess-pressure valves, upon their response pressure being attained, must allow the hydraulic fluid to escape at a corresponding, relatively low rate, in order to protect the supporting elements. It may also happen, however, that momentary high pressure peaks occur in the cylinder spaces filled with hydraulic fluid, due to sudden shocks caused, for example, by rock bursts or by a rapid extension of roof or corner cylinders. In such events again, the excess pressure valves must be capable of discharging the adequately large amount of pressure fluid in a correspondingly short period of time. However, it must be insured that the excess valves close as soon as the hydraulic pressure drops below a predetermined value.

To comply with these requirements, numerous excess pressure valves have already been proposed. For example, German Pat. No. 13 03 157 discloses an excess-pressure valve for securing hydraulic mining props, comprising a piston which is longitudinally displaceable in a cylindrical bore of a housing part and against the action of an adjustable spring, and is packed by an O-ring inserted in the bore, and whose front face is provided with a central, axial blind bore wherefrom radial bores are branched. The radial bores open into an annular groove which extends between two cylindrical guide surfaces of the piston and, at least at the discharge side, shallows out conically to the respective guide surface. As long as the fluid pressure acting on the piston does not reach the adjusted value, the piston remains in a closing position. During this time period, the hydraulic fluid passes through the axial blind bore and the radial bores into the annular groove and thereupon, through the narrow gap between the cylindrical bore in which the piston is guided and the piston itself, to the O-ring which is thereby deformed in such a manner that it tightly applies against its groove and against the outer cylindrical surface of the piston. As the piston is displaced, under increasing pressure and while compressing the spring element acting in the closing direction, in the opening direction, it reaches the position in which the hydraulic pressure in an annular groove deforms the O-ring to an extent such that a small amount of pressure fluid in the form of a very thin liquid film escapes, through the narrow gap between the bore for the piston and the upper cylindrical portion of the piston, into grooves and the interior space of a cavity of the valve casing. These grooves enlarge in steps in the direction of the cartridge-like casing, so that the cross-sectional area of discharge considerably increased and the resistance to flow diminishes in the discharge direction. As soon as, due to the discharge of an amount of the highly compressed hydraulic fluid, the respective hydraulic prop is pressure-relieved, the piston is pushed back by the spring element into its closing position. Consequently, the discharged volume of hydraulic fluid depends on the position of the piston within its bore. If the piston is only slightly displaced, so that the upper edge of the annular groove comes into a position about at half the height of the O-ring or somewhat higher, only a small amount of hydraulic fluid will escape, since in that position, still the full resistance to discharge of the narrow annular gap between the cylinder wall of the bore and the piston above the O-ring must be overcome. If, on the contrary, the upper edge of the annular groove advances into a position at the upper portion of the O-ring or even beyond, into the zone of the grooves which communicate with the interior of the valve casing, the discharged amount is substantially larger. The result is correspondingly faster reduction of the hydraulic pressure in the pressure space of the prop, down to the rated pressure. This excess pressure valve thus operates in different stages.

What is disadvantageous in this prior art valve in the first place is that its individual parts are relatively complicated. The piston, for example, is very expensive to manufacture. Aside from its relatively simple outer cylindrical surface, the axial blind bore is to be machined. This blind bore must be connected to the annular groove by several radial bores. In addition, the piston has a hemispherical head to bear against an abutment which is acted upon by the spring element and loads the piston in the closing direction. Also, it is questionable whether the excess pressure valve is capable of discharging a sufficient volume of fluid upon a rock burst, since even in the maximum opening position, the axial blind bore is connected to the grooves of the valve casing only through the radial bores and, particularly, through the relatively shallow, axially wide annular groove.

Another excess-pressure valve for hydraulic mining props is known from the German Utility Model No. 78 02 256. This valve is designed for a pressure range of from 200 to 600 bar, and also comprises a piston which is held in its closing position by a spring element and provided with an axial blind bore with radial discharge bores leading to the cylindrical circumference and terminating in flaring bores or edges with a broken configuration. Downstream of these radial discharge bores, an O-ring is received in an annular groove of the cylindrical guide surface, which ring tightly embraces the piston.

This construction is disadvantageous particularly in that the O-ring is loaded by the hydraulic fluid so-to-speak pointwise, in conformity to the location of the radial bores, which results in a considerable wear so that the excess-pressure valve may become unusable after a relatively short period of service. In addition, it is not insured that the valve will reliably discharge, in a short time period, correspondingly large amounts of hydraulic fluid even upon rock bursts not only small amounts adequate to the roof and floor convergence.

A relatively complicated design of an excess pressure valve to be used in hydraulic mining props is disclosed and shown in German OS No. 24 08 106. This prior art valve also comprises a piston which is displaceable against a restoring spring force in a cylindrical bore of a housing part and packed at its circumference by an O-ring, and has an axial bore communicating with the high pressure side and radial bores branching therefrom and opening to the circumference of the piston. This piston is actuated by a control piston which is loaded frontally by the hydraulic high pressure and has a diameter which is substantially smaller than that of the piston, with the axial blind bore of the piston being connected to the pressure space through at least one circumferential recess and at least one connecting passage of the housing part.

This prior art design requires many individual parts, partly with complicated shapes of spherical portions, crossbores, and radial channels, causing high manufacturing costs and considerably increasing their susceptibility to troubles. Also, the O-ring is loaded to a certain extent pointwise, so that this design again tends to a relatively strong wear of the seal.

It has been attempted to reduce these drawbacks by another design, which is known to the applicant from practical use, inwhich the radial channels are so-to-speak spirally distributed over the circumference of the blind axial bore, however, this cannot effectively prevent the wear of the O-ring, quite disregarding the fact that it hardly permits to discharge large fluid volume within a very short period of time, upon rock bursts. In addition, applicant does not know whether this design may be taken as reference, so that this disclosure is made under the reservation that this design does not constitute prior art nor prior use.

German AS No. 21 30 472 relates to another type, with two separate excess-pressure valves in a hydraulic prop, which are responsive sequentially, depending on the fluid volumes to be discharged.

SUMMARY OF THE INVENTION

The invention is directed to the elimination of the disadvantages of the prior art designs, and to an excess-pressure valve for hydraulic supporting elements employed in underground mining, including two sequentially responsive stages for discharging substantially different volumes of fluid.

In contradistinction to the prior art designs, the inventive excess pressure valve is to be simple in construction and composed of a small number of component parts which are easy to manufacture and not susceptible to troubles, even after an extended period of service.

In accordance with the invention, an excess pressure valve for props which have telescopic parts which are extensible and retractable by fluid under pressure comprises a valve housing having a bore therethrough with one connection end connectable to the fluid under pressure and an opposite open end. A tubular sleeve is located in the bore and has a passage therethrough for the fluid under pressure which communicates in the space between the tubular sleeve and a piston also located in the bore between the sleeve and the open end. The piston is biased in a direction toward the sleeve and the sleeve is biased in a direction toward the piston. Advantageously a spring plate is employed for biasing the piston toward the sleeve and it includes a rod portion forming an indicator which projects out of the open end when the pressure of the fluid exceeds a predetermined amount. The construction includes a seal defined in the bore centrally of the piston and the sleeve and seals the space therebetween over a predetermined range of movement of both the sleeve and the piston. In addition, a discharge relieving bore is located intermediate the length of the housing and provides for a fluid pressure relief of a relatively small amount with a further larger relief bore providing a discharge for the fluid under pressure is located further toward the open end of the housing and becomes effective only after the piston moves beyond this location under pressure to uncover the bore.

The inventive excess-pressure valve is extremely simple in construction. It comprises only few individual parts which can be manufactured easily and thus at low costs, for example, as simple turned and/or cupped parts. For example, a simple pipe length may be used as the sleeve and the piston may be made of rod stock. The front surfaces facing each other require, in practice, only a customary machining, they may be turned, ground or similarly worked, for example. If rod stock is employed for the piston, or a pipe for the sleeve, a particular machining of the facing front surfaces may even be omitted. The reason for this possibility is that a film of hydraulic fluid may continually be squeezed through between the opposite front faces of the piston and the sleeve, that is it is possible in any position of the valve parts that hydraulic fluid is present between the two opposite piston and sleeve faces. No sealing between these two parts is necessary. Also, there is no need for blind bores or radial bores. Since the hydraulic fluid can escape from between the opposite front faces of the piston and the sleeve, the seal is loaded on its circumferential surface with hydraulic fluid uniformly and not pointwise. Consequently, the seal is stressed more favorably and its wear is reduced. The operation may be such that the sleeve permanently communicates with the high pressure side, i.e. the interior space of the respective construction parts, so that the hydraulic pressure can propagate through the sleeve up to the front face of the piston. With the increasing hydraulic pressure, the piston is displaced toward the restoring spring. At the same time, the sleeve is held in contact with the piston. Upon further increase of the hydraulic pressure, the minigap between the sleeve and the piston travels past the seal. The hydraulic fluid penetrating into the minigap loads the seal in the radial direction whereby the packing is locally relieved and the seal is protected from mechanical damage that might be caused by the parts passing by. As soon as the minigap passes beyond the seal, a small portion of the fluid, such as displaced under normal conditions of convergence, can expand and escape through the radial gap between the piston and its guide to the outside.

If the amount of hydraulic fluid to be displaced further increases, the radial gap is no longer capable of letting the volume pass therethrough. The result is a surge, that is a small pressure increase. This pushes the sleeve and the piston against the restoring spring until the piston, since the sleeve abuts against the stop, disengages from the sleeve. At the same time, the minigap between the piston and the sleeve having passed through the annular gap, arrives to the bottom of the chamber. Due to the further motion of the piston against the restoring spring, the minigap enlarges according to the increasing volume of inflowing fluid and permits the fluid to excape through the chamber to the outlet. During this phase, the seal is already outside the critical zone of expansion and, therefore no longer exposed to any load.

It is further advantageous that the valve may be combined with a load indicator. Such an indicator may be simply coupled to the piston and/or to an abutment acting against the piston and, in turn, acted upon by the restoring spring.

Still another particular advantage is that, in practice, the opposite front faces of the sleeve and the piston do not form any deposit chambers where dirt residues from the hydraulic fluid could accumulate. Besides, some dirt deposits between these front faces would not disturb the operation in practice, since no absolute tightness therebetween is needed, on the contrary, a penetration of the hydraulic fluid between the front faces is intended.

In the design according to claim 2, the construction of the sleeve is simple and comprises a flange forming an effective pressure surface loaded by the hydraulic high pressure.

In the embodiment of claim 3, the construction is space saving, since all the moving parts can be accommodated concentrically in a cartridge-shaped casing.

According to claim 4, the sleeve is permanently loaded by the hydraulic high pressure and/or a spring force, in the direction of the piston, until the sleeve abuts against the stop and becomes disengaged from the piston.

Accordingly it is an object of the invention to provide an excess pressure valve for use in mine props which have telescopic parts which are extensible and retractable in fluid under pressure and which comprises a housing having a bore and with one end connecting the bore to the fluid under pressure and an opposite open end and which includes a piston slidable in the bore adjacent the open end and a sleeve adjacent the connecting end which has a passage for the fluid so that it communicates in the space between the sleeve and the piston and with means biasing both the piston and the bore toward each other and with a seal in the housing forming a seal with the space defined between the sleeve and the piston during a portion of its range of operation, the piston being movable to uncover the small diameter bore for relieving the fluid pressure and further to uncover a larger bore which permits the discharge of the fluid pressure.

A further object of the invention is to provide an excess pressure valve which is simple in design, rugged in construction and economical to manufacture.

GENERAL DESCRIPTION OF THE PREFERRED EMBODIMENT

Figure 1:
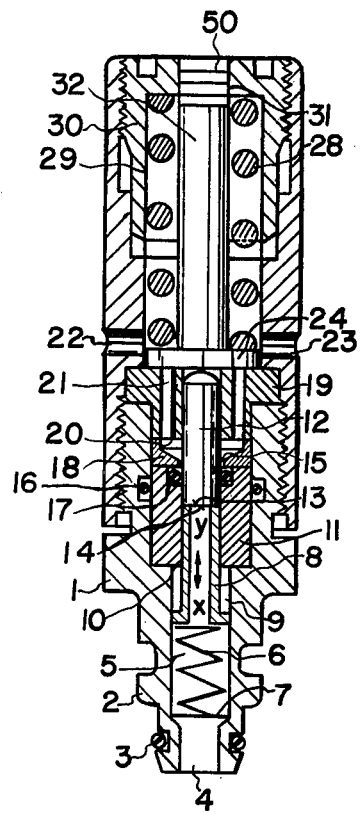
FIG. 1 is a vertical sectional view of an excess pressure valve having a load indicator and constructed in accordance with the invention, the valve being shown in the closed position of operation.

Referring to the drawings in particular the invention embodied therein comprises an excess pressure valve particularly for mine props which have telescopic parts which are extensible and retractable by the force of fluid under pressure.

The valve comprises a cylindrical cartridge-shaped housing or casing 1 having a uniform outer diameter over the greatest part of its length. On one end, casing 1 is provided with a connecting nipple 2 which can be detachably coupled to a receiving connection (not shown) of a hydraulic supporting element, for example, a fluid pressure operated hydraulic mine prop having telescopic extensible and retractable parts (not shown). A seal 3, designed as an O-ring in the shown embodiment, provides a light-tight connection, Otherwise, connecting nipple 2 may be designed in the usual way, thus, for example, in the manner known from excess-pressure valves or load indicators.

As shown in the drawing, casing 1 is provided with a centric connecting channel 4 having a channel portion 5 with a larger diameter. In this channel portion 5, a compression spring 6 is inserted bearing by one end against a shoulder 7 of connecting nipple 2 and by its other end against a tubular sleeve 8. Sleeve 8 has a flange-like radial extension 9 which is integral therewith and guided in channel portion 5, so that sleeve 8 is displaceable in the direction of its longitudinal axis, that is in the direction X and Y indicated by the double arrow. The displacement of sleeve 8 in the Y direction is limited by a stop 10 which is designed, in the embodiment of FIG. 1, as part of a bushing 11 fixed in casing 1, and in the embodiment of FIGS. 2 to 4, as a shoulder of casing 1.

A piston 12 is disposed coaxially with sleeve 8 and mounted for longitudinal displacement. In the shown embodiments, the piston 12 has the same outer diameter as the sleeve portion adjacent the piston. In all shown embodiments, piston 12 is made of solid rod stock. Both sleeve 8 and piston 12 may be made of a suitable metallic material, for example suitable stainless steel. However, the invention (problem and solution) also covers embodiments with the sleeve 8 and/or piston 12 made of suitable plastics for example, a suitable elastomer. Suited are, for example, polyurethane plastics which may meet all the requirements of resistance to swelling and to aggressive media, and which also have the desirable mechanical properties.

Figure 4:
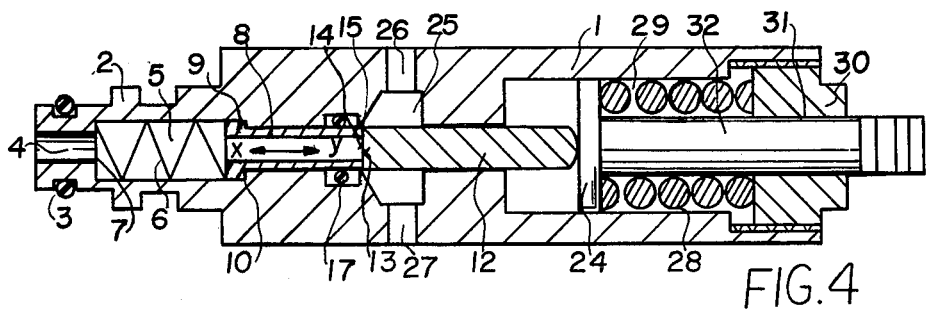

In all of the shown embodiments, the opposed front faces 13 and 14 of sleeve 8 and piston 12 respectively are planar, so that due to the hydraulic pressure acting through connecting channel 4 and the action of restoring spring 6 in the Y direction, sleeve 8 is urged into contact with the front face 14 of piston 12 until its extension 9 impinges on stop 10, and the sleeve disengages from piston 12 (FIG. 4). In fact, an absolute tightness between front faces 13 and 14 is not desired. It is rather provided, as will be explained hereinafter, that hydraulic fluid passes through this minigap between faces 13 and 14 into an annular gap 15 formed at the circumferential surface of the piston.

In the embodiment of FIG. 1, bushing 11 in casing 1 is sealed so that it is leak proof by means of a seal or annular ring 16. Another seal or annular ring 17, which can apply against the outer circumferential surface of piston 12 or the outer circumferential surface of sleeve 8, is provided, in the embodiment of FIG. 1, in the bushing 11 and, in the embodiment of FIGS. 2 to 4 the seals are provided in a groove of casing 1.

In the embodiment of FIG. 1, in the opening direction, that is in the direction Y, bushing 11 is followed by a supporting ring 18 which, on one side, bears frontally on bushing 11 and, on the other front side, applies against a guide bushing 19. The supporting ring 18 has a radial enlargement 20 communicating with annular gap 15 to permit flow of liquid. A plurality of channels 21 extends axially through guide bushing 19 and establishes communication with radially extending discharge channels 22, 23 with the same purpose of permitting flow of liquid.

Figure 2:
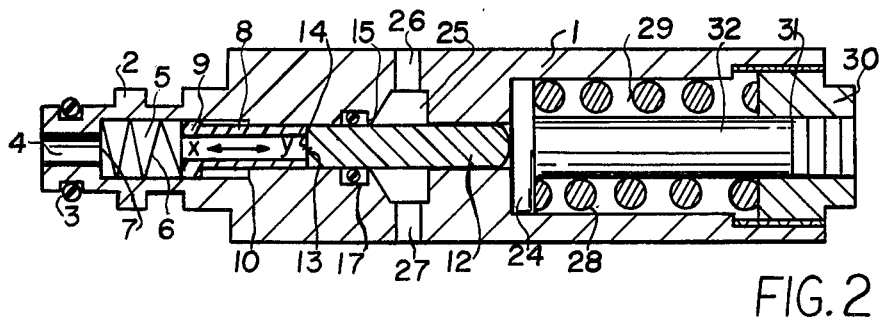
FIGS. 2, 3 and 4 are views similar to FIG. 1 of other embodiments of the invention having valve parts shown in different positions of operation.
Figure 3:
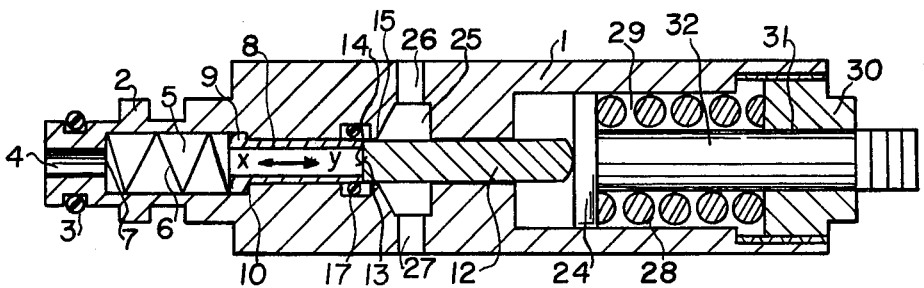

In the embodiment of FIGS. 2 to 4, annular gap 15 communicates directly with a chamber 25 having a function corresponding to that of enlargement 20 in the embodiment of FIG. 1. Chamber 25 is again followed by discharge channels 26 and 27 corresponding to discharge channels 22 and 23.

In all the shown embodiments, a spring plate 24 acts on piston 12 in the closing direction, i.e. the direction X. At the spring plate side remote from piston 12, a spring element 28 is accommodated in a chamber 29 and comprises, in the shown embodiments, a helical compression spring applying, by its other end, against an abutment 30 which is adjustable in the axial direction and designed, in the shown embodiments, as a screw plug having a center bore 31 which serves as guide for a load indicator 32. Load indicator 32 extends coaxially of piston 12 and sleeve 8 and, in the shown embodiment, is made in one piece with spring plate 24. On its free end projecting from abutment 30, the indicator is provided, in the shown embodiments, with four graduation marks 50, each indicating 110 bars. The outer front face of abutment 30 represents the reading basis of load indicator 32.

The valve, in the shown embodiments, operates as follows:

The hydraulic pressure reaches sleeve 8 through connecting channel 4 in which a filter may be received, and channel portion 5. Sleeve 8 and piston 12 are both guided in bushing 11 and guide bushing 19 (FIG. 1), or in the respective sections of the casing (FIGS. 2 to 4). With the increasing hydraulic pressure, piston 12 is displaced against the restoring force of compression spring 28, in the direction Y. At the same time, sleeve 8 is held in contact with the piston by compression spring 6. Upon a further pressure increase, the minigap formed between the opposite front faces 13 and 14 of sleeve 8 and piston 12 moves past seal 17. The hydraulic fluid penetrated into the minigap exerts a radial pressure on seal 17, thereby locally relieving the packing and protecting the seal from mechanical damage which may be caused by the parts passing by. As soon as the minigap passes beyond seal 17, a small amount of fluid, which is displaced under normal conditions of roof and floor convergence, can expand between piston 12 and sleeve 8 and escape through annular gap 15 past supporting ring 18 and through enlargement 20 as well as channels or bores 21. Instead of one seal 17 as shown, a plurality of such sealing elements may be arranged axially and/or radially side by side one above the other. Instead of an O-ring, other suitable sealing elements may be employed.

Upon increase of the hydraulic fluid volume to be expanded, annular gap 15 can no longer receive the amount for discharge. The surge thereby caused results in a small rise in pressure. Sleeve 8 and piston 12 are pushed by this pressure against the action of spring element 28 until the collar or flange 9 of sleeve 8 abuts on stop 10 of bushing 11 (FIG. 1) or of the casing (FIGS. 2-4). At the same time, the minigap between front faces 13 and 14 of sleeve 8 and piston 12 moves along annular gap 15 and arrives to the bottom end of chamber-like enlargement 20 (FIG. 1) or 25 (FIGS. 2-4). Further motion of piston 12 against the restoring force of spring element 28 enlarges the minigap between front faces 13 and 14 to an extent corresponding to the volume of displaced hydraulic fluid (for example, FIG. 4) and the hydraulic fluid is discharged through chamber 20 or 25 and channel 23 and 22 (FIG. 1) or 25 and 27 (FIGS. 2-4). During this phase, seal 17 is already outside the critical zone of expansion and therefore, in practice, no longer exposed to any load.

To embody the inventive idea, there is no need for combining the valve with a load indicator 32, as shown. Embodiments without a load indicator are possible, or the load indicator may be designed and disposed in a different manner.

The features described in the specification and claims and shown in the drawings may be applied individually, or in any combination.

In the embodiment according to claim 5, a long life of the seal is insured, due to the superficial support of the seal, since the seal is prevented from being damaged by sharp edges, particularly during the phase of disengagement.

While a specific embodiment of the invention has been shown and described in detail to illustrate the application of the principles of the invention, it will be understood that the invention may be embodied otherwise without departing from such principles.

What is claimed is:

1. An excess pressure valve particularly for mine props having telescopic parts which are extensible and retractable by fluid under pressure, comprising a valve housing have a bore extending therethrough from a connection end connectable to a source of fluid under pressure to an opposite open end, a tubular sleeve in said bore having a passageway extending therethrough for a passage of the fluid under pressure, said tubular sleeve having an annular inlet end face with an outwardly extending flange facing the connection end and an opposite annular pressure end face, a piston in said bore between said tubular sleeve and the open end, said piston having an inlet end face opposing said pressure end face of said tubular sleeve and an opposite piston pressure end face, spring means biasing said piston in a direction toward said sleeve, an additional pressure spring continuously biasing said sleeve toward said piston over a predetermined range of movement and the fluid under pressure maintaining a space between said piston and said tubular sleeve, seal means defined in said bore and isolating the space between said piston and said tubular sleeve from said opposite open end over a predetermined range of movement of said piston and said tubular sleeve, a discharge relieving bore located intermediate the length of said housing and connected to said bore through the space between said piston and said tubular sleeve when said tubular sleeve is positioned downstream of said seal means to relieve the fluid under pressure therebetween, said piston being operative to move further downstream from said seal means responsive to a further increase in pressure of the fluid under pressure, and a pressure fluid discharge passage uncoverable by said further movement of said piston further downstream from said seal means communicating with said space between said piston and said sleeve to permit the discharge of additional fluid from the bore, and said housing including a shoulder defined therein against which the flange abuts when said sleeve moves to a position at which the said pressure fluid discharge passage is uncovered by said piston, so that further subsequent movement of said piston separates said piston inlet end face from said sleeve pressure end face.

2. An excess pressure valve according to claim 1, further comprising a guide bushing in said housing defining a part of said bore, said piston being slidable in said guide bushing, said spring means biasing said piston including means for adjusting the tension thereof to vary the biasing force.

3. An excess pressure valve according to claim 1, wherein said seal means includes an annular seal member, said annular seal member being loaded radially by the fluid pressure between said tubular sleeve and said piston.

4. An excess pressure valve according to claim 1, wherein said spring means includes an indicator having an end adjacent said piston and a spring plate portion, a load indicator rod portion connected to said spring plate portion extending outwardly through the open end of said housing, said rod portion having indications thereon which become exposed when said rod member moves out the open end of said bore and a spring in said housing biased against said spring plate.

5. An excess pressure valve according to claim 4, wherein said spring means includes a plug member threaded into said housing and defining a shoulder against which one end of said spring engages, said plug member being tightenable to change the force of said spring acting on said spring plate.

* * * * *